(12) United States Patent
Tenny

(10) Patent No.: US 9,363,790 B2
(45) Date of Patent: *Jun. 7, 2016

(54) SCHEDULING OF DYNAMIC BROADCAST CHANNEL

(71) Applicant: QUALCOMM Incorporated, San Diego, CA (US)

(72) Inventor: Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

This patent is subject to a terminal disclaimer.

(21) Appl. No.: 13/889,095

(22) Filed: May 7, 2013

(65) Prior Publication Data

US 2013/0250926 A1    Sep. 26, 2013

Related U.S. Application Data

(63) Continuation of application No. 12/047,624, filed on Mar. 13, 2008, now Pat. No. 8,457,093.

(60) Provisional application No. 60/894,893, filed on Mar. 14, 2007.

(51) Int. Cl.
    *H04L 12/28*    (2006.01)
    *H04W 72/00*    (2009.01)
    *H04W 48/12*    (2009.01)

(52) U.S. Cl.
    CPC ............ *H04W 72/005* (2013.01); *H04W 48/12* (2013.01)

(58) Field of Classification Search
    CPC . H04L 47/10; H04L 2012/5631; H04L 47/15; H04L 47/2441; H04L 47/70; H04L 2012/5679; H04L 47/50; H04L 47/622; H04B 7/2123; H04B 7/212; H04W 72/04; H04W 88/08; H04W 76/00

USPC .............. 370/230, 395.4, 322, 329, 341, 348, 370/389, 395.52, 401, 400, 402, 466
    See application file for complete search history.

(56) References Cited

U.S. PATENT DOCUMENTS 6,819,930 B1 *  11/2004  Laroia ................... H04W 72/14
                                                    370/329
7,116,648 B2    10/2006  Choi
(Continued)

FOREIGN PATENT DOCUMENTS

AU    2008224836    1/2012

OTHER PUBLICATIONS

Ericsson: "Broadcast of System Information in E-UTRA", 3rd Generation Partnership Project (3GPP), R2-070799, USA, Feb. 9, 2007, XP050133824.

(Continued)

*Primary Examiner* — Brenda H Pham
(74) *Attorney, Agent, or Firm* — Anthony R. Morris

(57) ABSTRACT

System(s) and method(s) are provided that facilitate scheduling system information. Scheduling of system information exploits a control channel associated with a broadcast channel (BCH), and utilizes reference information (e.g., a time reference or a scheduling reference) in addition to system information typically carried by scheduling units (SUs). Scheduling proceeds primarily according to three planning types. (i) A SU carries an indication of a time at which a disparate SU is to be scheduled in the control channel associated with the BCH. The indicated time is a specific time slot in the control channel or a lower bound for an actual scheduling instant. (ii) A first SU indicates a time cycle, or time period, for scheduling disparate scheduling units in the control channel associated with the BCH. (iii) A first SU carries a time indication to a second SU in a same control channel, the second SU indicates a time at which a third SU is to be scheduled.

35 Claims, 12 Drawing Sheets

(56) References Cited

U.S. PATENT DOCUMENTS

| | | | |
|---|---|---|---|
| 7,298,713 B2 | 11/2007 | Goldberg et al. | |
| 8,457,093 B2 * | 6/2013 | Tenny | H04W 72/005 370/345 |
| 2002/0034170 A1 | 3/2002 | Tiedemann, Jr. et al. | |
| 2004/0105393 A1 | 6/2004 | Ronneke et al. | |
| 2005/0163106 A1 | 7/2005 | Vaittinen et al. | |
| 2006/0068780 A1 | 3/2006 | Dalsgaard et al. | |
| 2006/0212902 A1 | 9/2006 | Seo et al. | |
| 2008/0081671 A1 | 4/2008 | Wang et al. | |
| 2008/0225823 A1 | 9/2008 | Tenny | |

OTHER PUBLICATIONS

LG Electronics: "Delivery of System Information", 3GPP TSG-RAN WG2 #57, R2-070520, St. Louis, USA, Feb. 15-19, 2007, XP050133574.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 3GPP TS 36.300 V0.9.0, Release 8, (Mar. 2007).

3rd Generation Partnership Project, Technical Specification Group Radio Access Network; Radio Resource Control (RRC) Protocol Specification (Release 6), 3rd Generation Partnership Project (3GPP); Technical Specification (TS) 25.331 V6.8.0, Dec. 1, 2005 pp. 44-71, XP002433615.

International Search Report, PCT/US08/057142, International Search Authority, European Patent Office, Aug. 21, 2008.

QUALCOMM Europe, "Scheduling of BCH", 3GPP TSG-RANG2 #57 bis, Mar. 30, 2007, R2-071204, URL:http://www.3gpp.org/FTP/tsg_ran/WG2_RL2/TSGR2_57bis/Documents/R2-071204.zip.

Samsung, "Scheduling and organization of flexible system information", 3GPP TSG-RAN WG2 Meeting #56bis, Jan. 19, 2007, R2-070168, URL: http://www.3gpp.org/ftp/tsg_ran/WG2_RL2/TSGR2_56bis/Documents/R2-070168.zip.

Taiwan Search Report—TW097109231—TIPO—Jul. 21, 2011.

Written Opinion, PCT/US08/057142, International Search Authority, European Patent Office, Aug. 21, 2008.

* cited by examiner

SCHEDULING OF DYNAMIC BROADCAST CHANNEL

CLAIM OF PRIORITY UNDER 35 U.S.C. §120

This application for patent is a continuation application of pending U.S. patent application Ser. No. 12/047,624 filed on Mar. 13, 2008 and entitled "SCHEDULING OF DYNAMIC BROADCAST CHANNEL", which claims priority to U.S. Provisional Patent Application No. 60/894,893 filed on Mar. 14, 2007 and entitled "SCHEDULING OF DYNAMIC BCH IN LTE." These applications are assigned to the assignee hereof and the entireties of these applications are expressly incorporated herein by reference.

BACKGROUND

I. Field

The subject specification relates generally to wireless communication and, more particularly, to scheduling system information associated with the technology utilized for communication.

II. Background

Wireless communication systems are widely deployed to provide various types of communication content such as voice, video, data, and so on. These systems may be multiple-access systems capable of supporting simultaneous communication of multiple terminals with one or more base stations. Multiple-access communication relies on sharing available system resources (e.g., bandwidth and transmit power). Examples of multiple-access systems include code division multiple access (CDMA) systems, time division multiple access (TDMA) systems, frequency division multiple access (FDMA) systems, and orthogonal frequency division multiple access (OFDMA) systems.

Communication between a terminal in a wireless system (e.g., a multiple-access system) and a base station is effected through transmissions over a wireless link comprised of a forward link and a reverse link. Such communication link may be established via a single-input-single-output (SISO), multiple-input-single-output (MISO), or a multiple-input-multiple-output (MIMO) system. A MIMO system consists of transmitter(s) and receiver(s) equipped, respectively, with multiple ($N_T$) transmit antennas and multiple ($N_R$) receive antennas for data transmission. SISO and MISO systems are particular instances of a MIMO system. A MIMO channel formed by $N_T$ transmit and $N_R$ receive antennas may be decomposed into $N_V$ independent channels, which are also referred to as spatial channels, where $N_V \leq \min\{N_T, N_R\}$. Each of the $N_V$ independent channels corresponds to a dimension. The MIMO system can provide improved performance (e.g., higher throughput, greater capacity, or improved reliability) if the additional dimensionalities created by the multiple transmit and receive antennas are utilized.

Regardless the peculiarities of the multiple available wireless communication systems, in each of such systems, operation of a wireless device relies upon successfully receiving system information. Typically, such system information is received in the device according to scheduling mechanisms adopted by a scheduler that operates in a serving base station. Generally, the efficiency of the wireless device operation depends to a significant extent on the scheduling mechanisms of system information. For example, battery utilization can be substantially deteriorated when a scheduling mechanism involves unnecessary utilization of transceiver and associated components. Such a scenario typically arises when a transceiver in a mobile station actively "listens" to a channel without receiving information that furthers equipment operation, such as updated or new, system information. Accordingly, a need exists in the art for efficient scheduling mechanism(s) that reduces unnecessary utilization of transceiver and associated components of a wireless device operating in wireless environment.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The subject specification discloses system(s) and method(s) that facilitate scheduling system information. Scheduling of system information exploits a control channel associated with a broadcast channel (BCH), and utilizes reference information (e.g., a time reference or a scheduling reference) in addition to system information typically carried by scheduling units (SUs). Scheduling proceeds primarily according to three scheduling planning types. (i) Explicit scheduling plan. A SU carries an indication of a time at which a disparate SU is to be scheduled in the control channel associated with the BCH. The indicated time is a specific time slot in the control channel or a lower bound for an actual scheduling instant. (ii) Periodic scheduling plan. A first SU indicates a time cycle, or time period, for scheduling disparate scheduling units in the control channel associated with the BCH. (iii) Transitive-explicit scheduling plan. A first SU carries a time indication to a second SU in a same control channel, the second SU indicates a time at which a third SU is to be scheduled.

In particular, in an aspect of the subject innovation, a method for scheduling system information in a wireless communication system is disclosed, the method comprising: scheduling a first scheduling unit, wherein the first scheduling unit includes an indication of a time at which a second scheduling unit is to be scheduled; scheduling the second scheduling unit in a control channel associated to a broadcast channel; and conveying the first scheduling unit and conveying the second scheduling unit.

In another aspect, the subject specification describes a method employed in a wireless communication system, the method comprising: scheduling a first scheduling unit that indicates a second scheduling unit, wherein the second scheduling includes an indication of a time at which a third scheduling unit is to be scheduled; scheduling the third scheduling unit in a control channel associated to a broadcast channel; and conveying the first, second, and third scheduling units.

In a further aspect, a wireless communication device is disclosed, the device comprising: a processor configured to associate a control channel to a broadcast channel; to schedule a first scheduling unit (SU) that carries at least an indication of a time at which a second SU is to be scheduled; to schedule the second SU in the control channel associated to the broadcast channel; to schedule a third SU that indicates a fourth SU, wherein the fourth SU comprises an indication of a time at which a fifth SU is to be scheduled; and to schedule the fifth scheduling unit in the control channel associated to the broadcast channel; and a memory coupled to the processor.

In a further yet aspect, the innovation discloses a computer program product, comprising a computer-readable medium including: code for causing at least one computer to schedule a first scheduling unit that conveys at least an indication of an instance at which a second scheduling unit is to be scheduled; code for causing the at least one computer to schedule the second scheduling unit in the control channel associated to the broadcast channel; code for causing the at least one computer to schedule a third scheduling unit that indicates a fourth scheduling unit, wherein the fourth scheduling includes an indication of a time at which a fifth scheduling unit is to be scheduled; code for causing the at least one computer to schedule the fifth scheduling unit in a control channel associated to a broadcast channel; and code for causing the at least one computer to convey the first, second, third, fourth, and fifth scheduling units.

In a still further aspect, an apparatus that operates in a wireless communication system is described, the apparatus comprising: means for scheduling a first scheduling unit, wherein the first scheduling unit includes an indication of a set of times at which a second scheduling unit is to be scheduled; means for scheduling the second scheduling unit in a control channel associated to a broadcast channel; means for conveying the first scheduling unit and conveying the second scheduling unit.

In another aspect, the subject innovation relates to an apparatus that operates in a wireless system, the apparatus comprising: means for scheduling a first scheduling unit that indicates a second scheduling unit, wherein the second scheduling includes an indication of a time at which a third scheduling unit is to be scheduled; means for scheduling the third scheduling unit in a control channel associated to a broadcast channel; and means for conveying the third, fourth, and fifth scheduling units.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
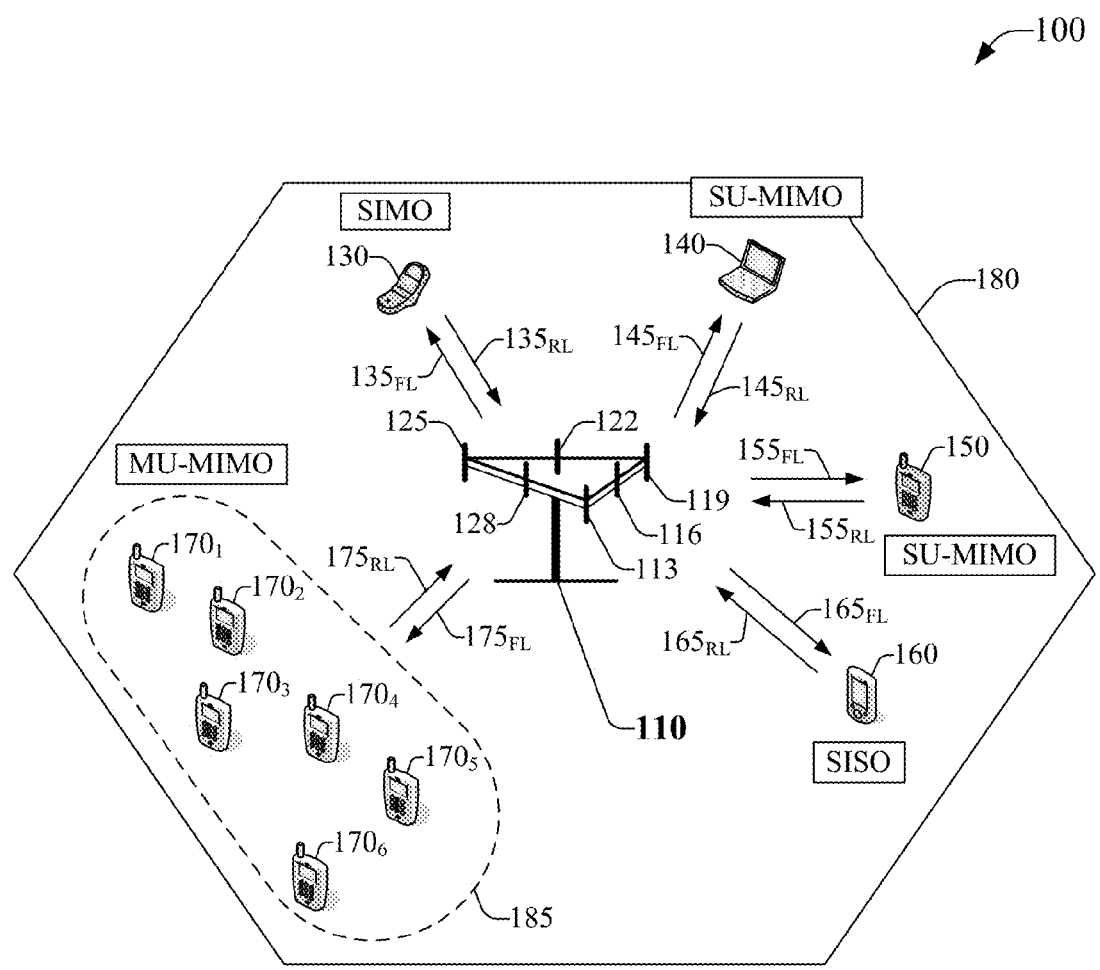
FIG. 1 illustrates a multiple access wireless communication system where an access point with multiple antennas simultaneously can communicate with various access terminals that operate in SIMO, SU-MIMO, and MU-MIMO. The access point can exploit flexible CQI reporting as disclosed herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a remote station, an access point, a remote terminal, an access terminal, user terminal, a user agent, a user device, a customer premises equipment, or a user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point, Node B, evolved Node B (eNodeB), or some other terminology.

System(s) and method(s) are provided that facilitate scheduling system information. Scheduling of system information exploits a control channel associated with a broadcast channel (BCH), and utilizes reference information (e.g., a time reference or a scheduling reference) in addition to system information typically carried by scheduling units (SUs). Scheduling proceeds primarily according to three planning types. (i) A SU carries an indication of a time at which a disparate SU is to be scheduled in the control channel associated with the BCH. The indicated time is a specific time slot in the control channel or a lower bound for an actual scheduling instant. (ii) A first SU carries a time indication to a second SU in a same control channel, the second SU indicates a time at which a third SU is to be scheduled. (iii) A first SU indicates a time cycle, or time period, for scheduling disparate scheduling units in the control channel associated with the BCH.

Referring to the drawings, FIG. 1 illustrates a multiple access wireless communication system 100 where an access point 110 with multiple antennas 113-128 simultaneously schedules, and communicates with, various mobile terminals in SIMO, SU-MIMO, and MU-MIMO modes of operation according to aspects disclosed herein. The mode of operation is dynamic: access point 110 can reschedule the mode of operation of each of terminals 130-160 and $170_1$-$170_6$. Additionally, access point 110 can dynamically adjust reporting settings based on changing operation conditions that result for variations in scheduled operation. In view of the dynamic nature of operation, which includes CQI reporting, FIG. 1 illustrates a snapshot of communication links between terminals and antennas. As illustrated, such terminals can be stationary or mobile and, dispersed throughout a cell 180. As used herein and generally in the art, the term "cell" can refer to base station 110 and/or its coverage geographic area 180 depending on the context in which the term is used. Further, a terminal (e.g., 130-160 and $170_1$-$170_6$) can communicate with any number of base stations (e.g., shown access point 110) or no base stations at any given moment. It is noted that terminal 130 has a single antenna and therefore it operates in SIMO mode substantially at all times.

Generally, access point 110 possesses $N_T \geq 1$ transmit antennas. Antennas in access point 110 (AP) are illustrated in multiple antenna groups, one including 113 and 128, another including 116 and 119, and an additional including 122 and 125. In FIG. 1, two antennas are shown for each antenna group, even though more or fewer antennas can be utilized for each antenna group. In the snapshot illustrated in FIG. 1, access terminal 130 (AT) operates in SIMO communication with antennas 125 and 122, where antennas 125 and 122 transmit information to access terminal 130 over forward link $135_{FL}$ and receive information from access terminal 130 over reverse link $135_{RL}$. Mobile terminals 140 and 150 each communicate in SU-MIMO mode with antennas 119 and 116, while terminal 160 operates in SISO. MIMO channels are formed between each of terminals 140, 150, and 160, and antennas 119 and 116, leading to disparate FLs $145_{FL}$, $155_{FL}$, $165_{FL}$, and disparate RLs $145_{RL}$, $155_{RL}$, $165_{RL}$. Additionally, in the snapshot of FIG. 1, a group 185 of terminals $170_1$-$170_6$ is scheduled in MU-MIMO, having formed multiple MIMO channels between the terminal in the group 185 and antennas 128 and 113 in access point 110. Forward link $175_{FL}$ and reverse link RL $175_{RL}$ indicate the multiple FLs and RLs existing between terminals $170_1$-$170_6$ and base station 110. Furthermore, access point 110 can exploit OFDMA in order to accommodate communication from, and to, the disparate groups of mobile stations. It should be appreciated that disparate devices in cell 180 can execute disparate applications; accordingly, CQI reporting can proceed based on reporting policies established by an operator of access point 110.

In an aspect, advanced system such as LTE can exploit MIMO operation within both frequency division duplex (FDD) communication and time division duplex (TDD) communication. In FDD communication, links $135_{RL}$-$175_{RL}$ employs different frequency bands from respective links $135_{FL}$-$175_{FL}$. In TDD communication, links $135_{RL}$-$175_{RL}$ and $135_{FL}$-$175_{FL}$ utilize the same frequency resources; however, such resources are shared over time among forward link and reverse link communication.

In another aspect, system 100 can utilize one or more multiple-access schemes, in addition to OFDMA, such as CDMA, TDMA, FDMA, single-carrier FDMA (SC-FDMA), space division multiple access (SDMA), or other suitable multiple-access schemes. TDMA utilizes time division multiplexing (TDM), wherein transmissions for different terminals 130-160 and $170_1$-$170_6$ are orthogonalized by transmitting in different time intervals. FDMA utilizes frequency division multiplexing (FDM), wherein transmissions for different terminals 130-160 and $170_1$-$170_6$ are orthogonalized by transmitting in different frequency subcarriers. As an example, TDMA and FDMA systems can also use code division multiplexing (CDM), wherein transmissions for multiple terminals (e.g., 130-160 and $170_1$-$170_6$) can be orthogonalized using different orthogonal codes (e.g., Walsh-Hadamard codes) even though such transmissions are sent in the same time interval or frequency subcarrier. OFDMA utilizes orthogonal frequency division Multiplexing (OFDM), and SC-FDMA utilizes single-carrier FDM. OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally or alternatively, the system bandwidth can be divided into one or more frequency carriers, each of which can contain one or more subcarriers. Disparate carriers, or subbands (e.g., a set of tones), can be designated or scheduled for disparate terminals, or for different applications. To simplify system design, a homogenous traffic model can be preferred for a specific set of subbands, which can lead to substantially negligible heterogeneous traffic in each subband in the set of subbands. As an example, one or more subbands can be specified for voice-over-IP (VoIP) traffic only, while remaining subbands can be primarily targeted for high data rate applications (e.g., file transfer protocol (FTP)). As indicated above, specific assignments of subbands can dynamically change in response to changing traffic needs. Moreover, CQI reporting directives can also vary dynamically in response to traffic changes. An additional source of dynamic changes of subband assignment, and associated CQI reporting, can originate in performance (e.g., sector or cell throughput, data peak rate) gain or loss when mixing various traffics into one subband. While CQI reporting directives, or mechanisms, described herein are generally described for an OFDMA system, it should be appreciated that the CQI reporting directives disclosed herein can similarly be applied to substantially any wireless communication system operating in multiple access.

In a further aspect, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 (for example, to report CQI) can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Each group of antennas or the area in which they are designed to communicate (e.g., to convey or receive traffic, or CQI reports and other control data) are often referred to as a sector of the access point. A sector can be an entire cell 180, as illustrated in FIG. 1, or a smaller region (not shown). Typically, when sectorized, a cell (e.g., cell 180) includes a few sectors (not shown) covered by a single access point, like 110. It should be appreciated that the various aspects disclosed herein, and related to flexible CQI reporting, can be used in a system having sectorized and/or unsectorized cells. Furthermore, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. While the following description generally relates to a system in which each terminal communicates with one serving access point (e.g., 110) for simplicity, it should further be appreciated that terminals can communicate with substantially any number of serving access points.

In communication over forward links $135_{FL}$-$175_{FL}$, the transmitting antennas of access point 110 can utilize beamforming (e.g., to effect SDMA communication) in order to improve the signal-to-noise ratio of forward links for the different access terminals 130-160 and $170_1$-$170_6$. Also, an access point using beamforming to transmit to access terminals scattered randomly through its coverage causes less interference to access terminals in neighboring cells than an access point transmitting through a single antenna to all its access terminals. Such a mode of operation can be incorporated into scheduling system information by an access point (e.g., AP 110) operating in a wireless system (e.g., system 100) to mitigate scheduling units collisions and lost packets.

Figure 2:
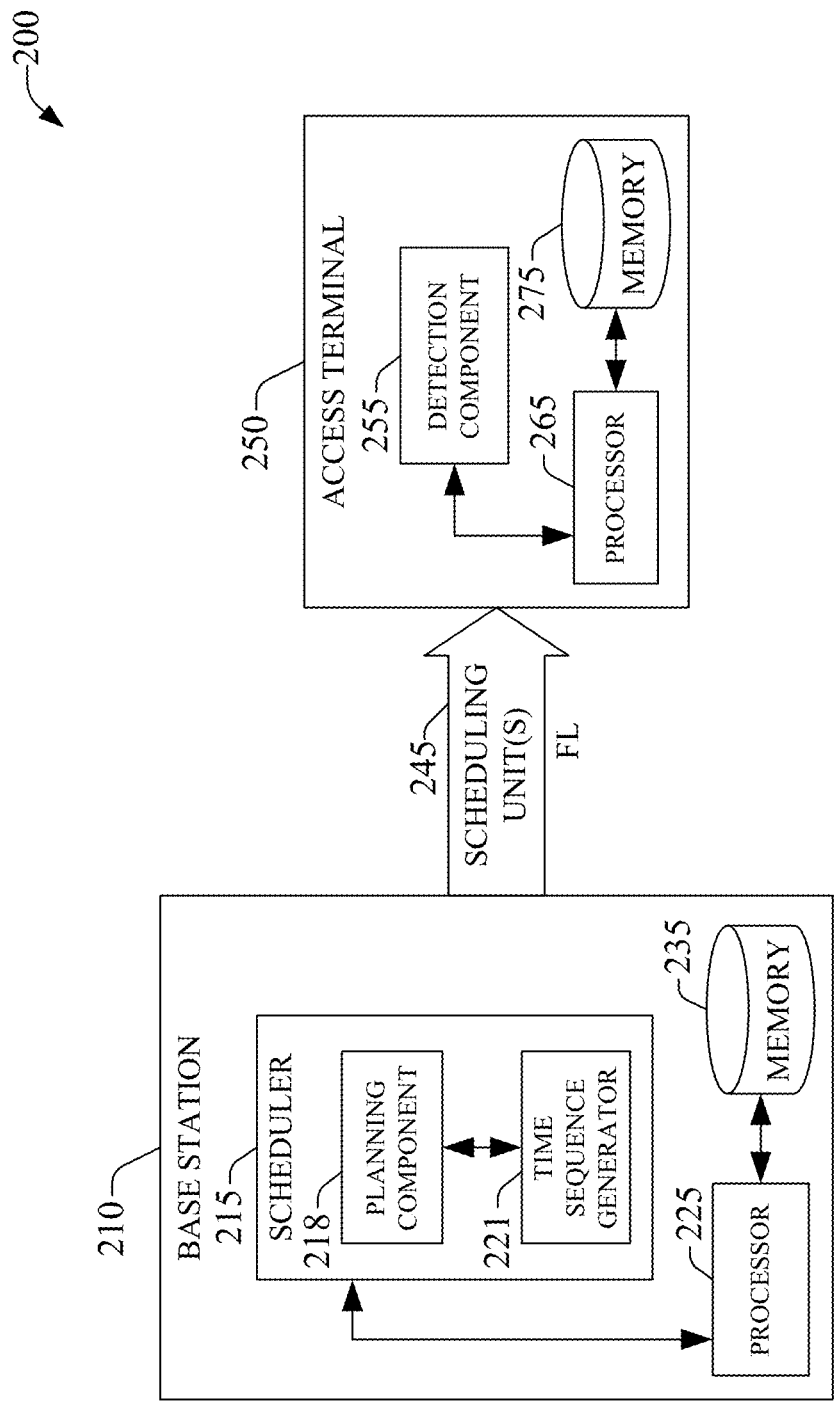
FIG. 2 illustrates an example system that facilitates scheduling system information in accordance with aspects described in the subject specification.
Figure 3A:
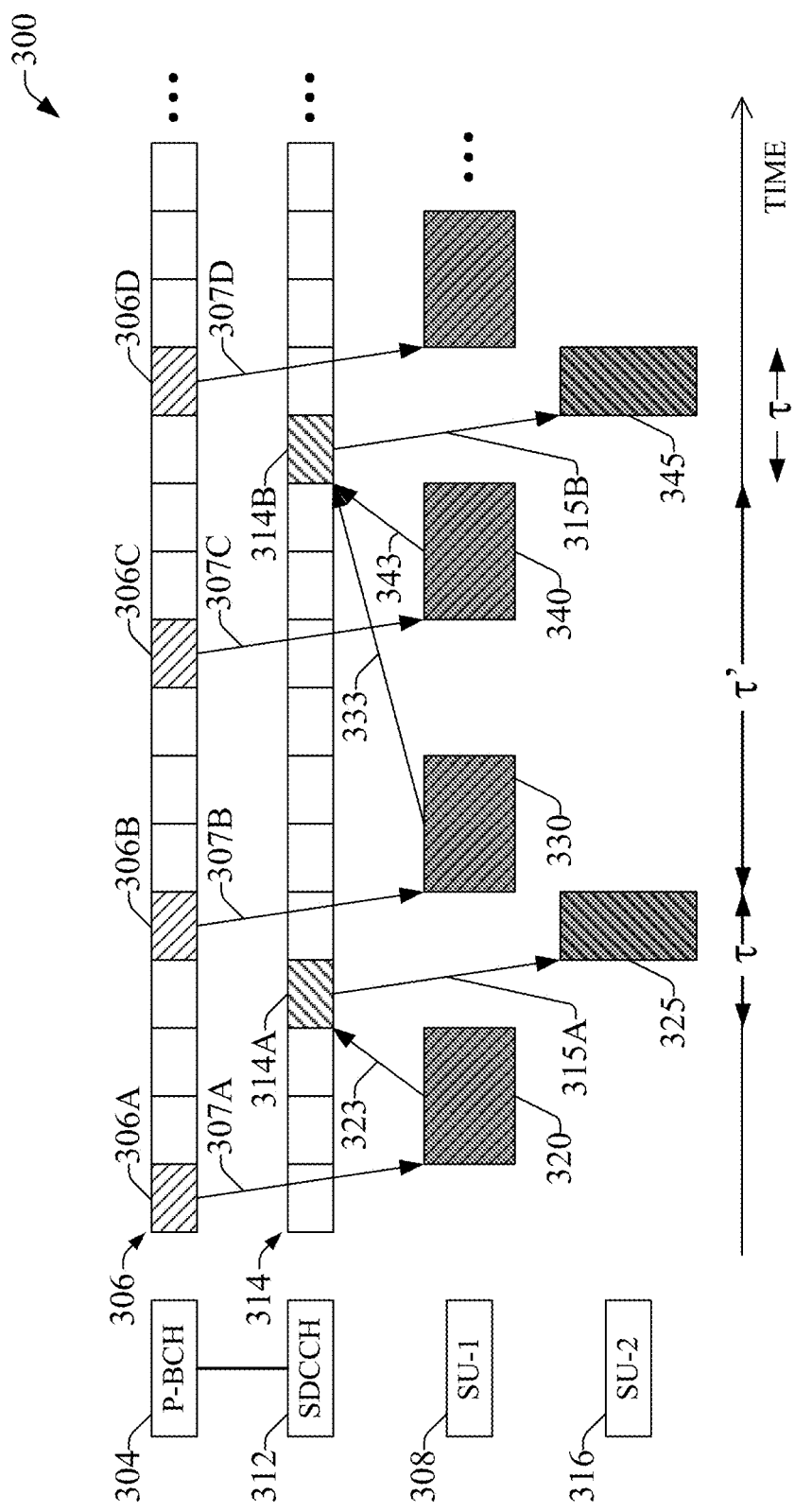
FIGS. 3A and 3B are diagrams that illustrate scheduling of system information utilizing a time references to a control channel associated with a broadcast channel: (A) specific time instance, and (B) time cycle.
Figure 3B:
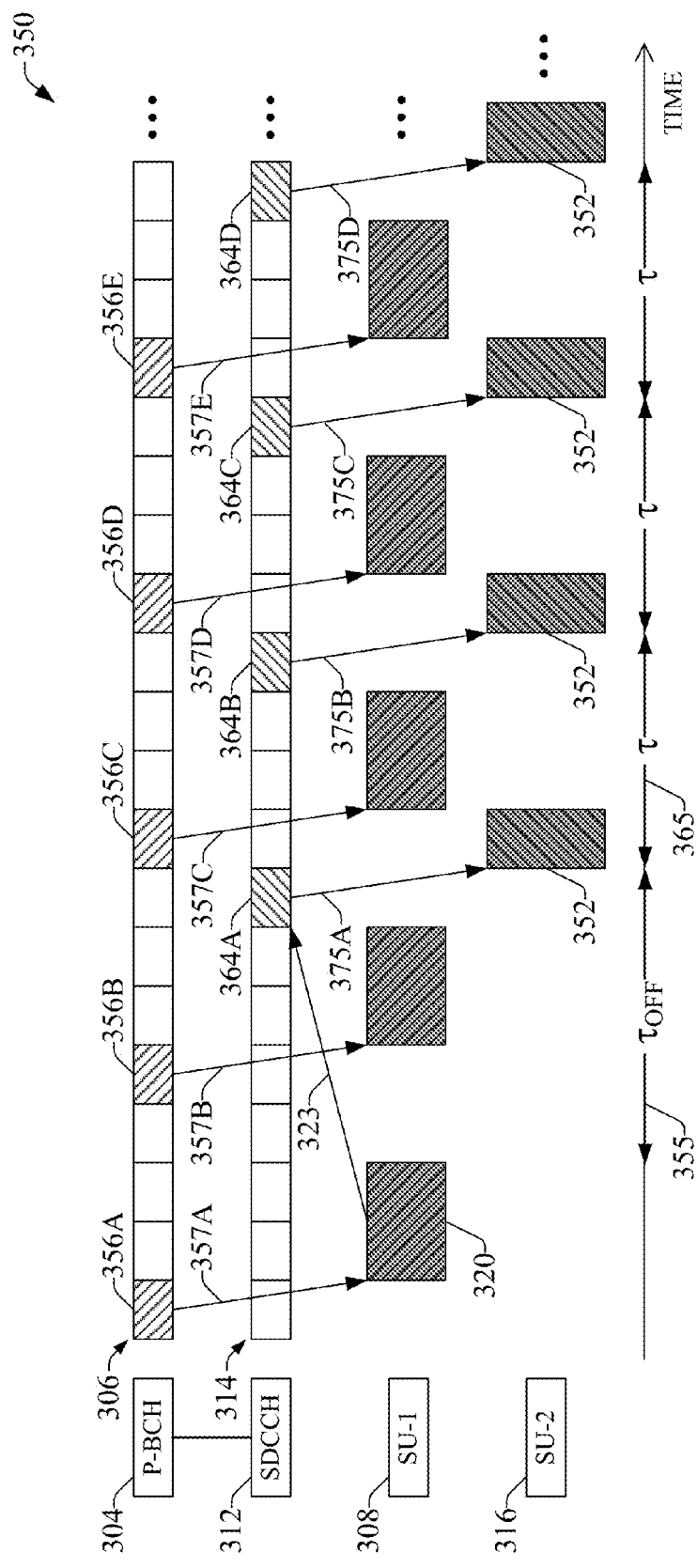
Figure 4:
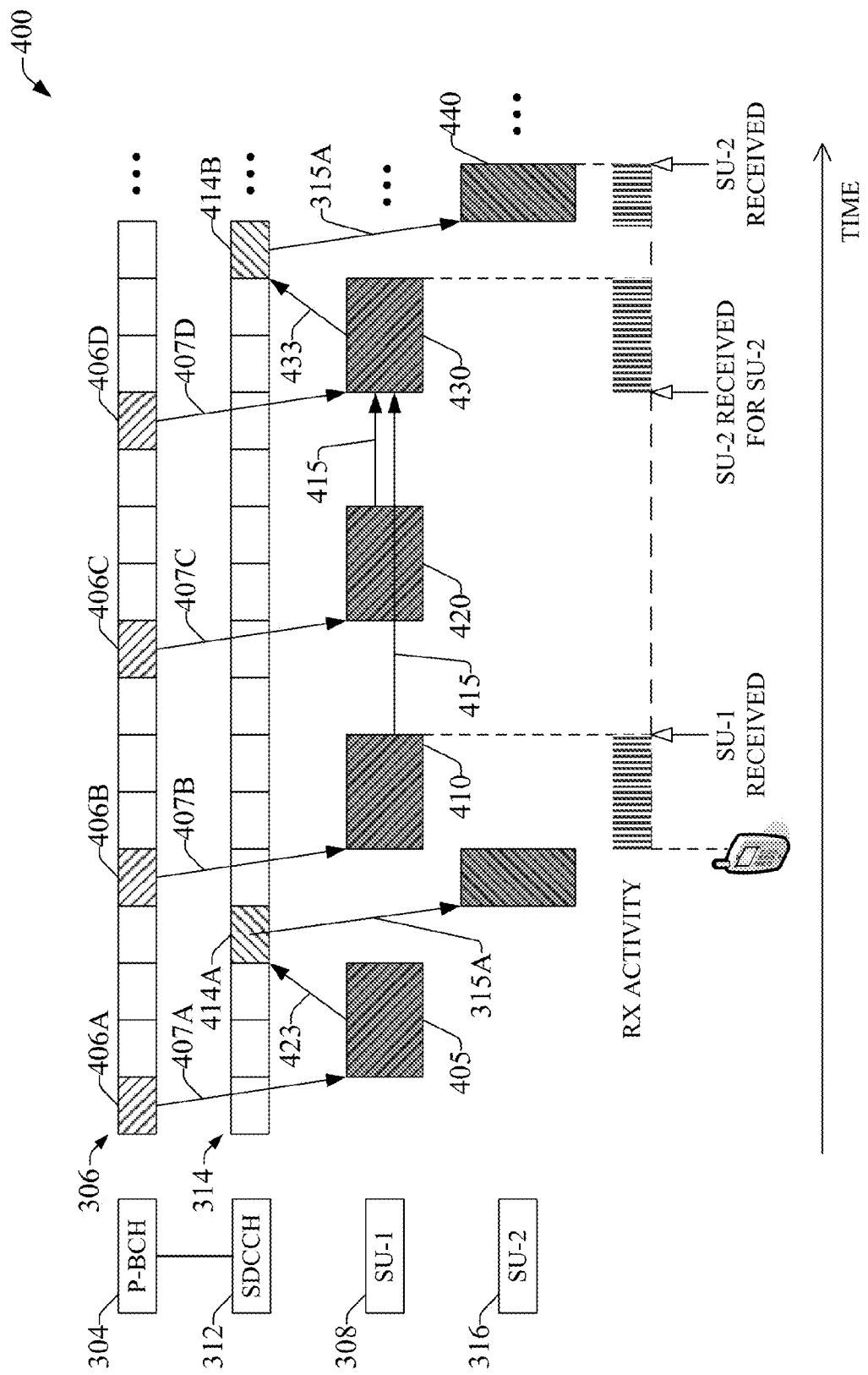
FIG. 4 illustrates scheduling of system information that exploits time references and reference to like scheduling units in accordance to aspects described herein.

FIG. 2 illustrates an example system 200 that facilitates scheduling system information by referencing scheduling units (SUs) to be scheduled. A base station 210 includes a scheduler which can schedule scheduling units carrying system information (e.g., system bandwidth, antenna configuration, cell identity, cyclic prefix (CP) timing, sub-carriers frequencies, and so on). A scheduling unit is a block of time-frequency resources, wherein system information is conveyed by a base station (e.g., BS 210). In an aspect, in LTE systems, scheduling units can be divided in at least two categories: SU-1, which correspond to the most frequently repeated SUs, and typically carries scheduling information related to scheduling of disparate scheduling units in addition to timing information necessary for time and frequency synchronization; and SU-2 scheduling units, which are scheduled to (i) convey changes in system information (e.g., changes in bandwidth, CP timing, . . . ) as well as additional system information, or (ii) refresh previously acquired system information, like acquired sub-carriers frequencies. To schedule SUs, planning component 218 relies on a control channel associated with a broadcast channel. (It should be appreciated that association with a broadcast channel ensures that scheduling information is delivered throughout a coverage area of a base station, and it can be read from substantially any mobile terminal, including those not fully synchronized with a serving cell.) Such a control channel can be established by base station 210 through processor 225, in order to schedule SU-2 category scheduling units. In an aspect, such a channel can be identified as a Stand-alone Dedicated Control Channel (SDCCH). To schedule system information efficiently and thus mitigate unnecessary utilization of transceiver resources, with the ensuing battery deterioration, planning component 218 can implement at least three scheduling plans discussed next. Each of the three plans are devised to reduce unnecessary utilization of transceiver resources in an access terminal, and to mitigate possible collisions among scheduled SUs. The plans extend the scheduling information associated with SU-1 by incorporating a time indication—e.g., a N-bit word, with N a positive integer—that can be utilized to identify an explicit, or specific, time at which a resource block carrying system information will be scheduled, or to indicate a schedule resource block carrying such an indication. Features of each plan are illustrated with FIGS. 3A and 3B, and FIG. 4, where appropriate.

(i) Explicit Scheduling Plan.

A first SU carrying system information can be scheduled, e.g., in P-BCH in LTE. The scheduled first SU (e.g., SU-1 320) carries an indication of a time τ323 at which a disparate SU (e.g., SU-2 325) is to be scheduled in the control channel associated with the BCH; e.g., SDCCH 312. The arrow 323 depicts such an indication, which can be an N-bit word conveyed in the resource block associated with SU 320. It is to be noted that such a time indication is absent in a conventional LTE systems. Generally, in the subject description, an arrow connecting a SU block (e.g., 330) with a SDCCH block (e.g., 314B) represent a time indication to the specific "landing" block. An "indicated" time, in an aspect, can be measured with respect to a resource block boundary, as depicted in diagram 200; nonetheless, other origins of time can be selected, such as a central time slot in a SU. It is noted that in diagram 300, resource blocks 306, for P-BCH, and 314 for SDCCH, are depicted. Moreover, resource blocks in which a system information is scheduled are indicated as hatched blocks; e.g., 306A, 306B, 306C, and 306D, and 314A and 314B. Furthermore, arrows 307A-307D, and 315A, 315B, pictorially depict the fact that a control block has a SU scheduled to be conveyed, e.g., transmitted in DL-SCH in LTE. It is to be noted that SUs can span a disparate number of time-frequency with respect to those resources employed to communicate a control channel block 306 or 314; hence, the differing sizes associated with SU blocks and P-BCH and SDCCH blocks in diagram 300. In an aspect, the indicated time t 323 is a specific time slot in the control channel SDCCH 312. It should be appreciated that such a scheduling plan can present practical complexities. Namely, the control channel, SDCCH 312, needs to have the ability to indicate which SU (e.g., 325 or 345) is being scheduled; the latter can be accomplished via additional information in the scheduling channel itself (in which it is assumed that space to enter additional information is available), or by using multiple BCCH (broadcast control channel)-RNTIs. It should also be appreciated that the scheduler 215 should guarantee in advance that timing of the scheduling events (e.g., t 323, τ' 333, or t 343) for different SUs (e.g., SU-2 325 and SU-2 345) fail to collide. In order to mitigate collisions, in an aspect, the time indication carried by the firstly scheduled SU (e.g., SU-1 320) can convey timing as a lower bound (conveying the semantic notion of "SU-2 will be scheduled 23873 slots from now, or shortly thereafter") rather than a specific time offset, or instance—e.g., "SU-2 is to be scheduled in $\tau_{OFF}$=23873 slots").

(ii) Periodic Scheduling Plan.

Alternatively, the time indication conveyed by a first scheduling unit (e.g., SU-1 320) can indicate a time cycle, or time period τ 365, for scheduling disparate scheduling units SU-2 352 in the control channel associated with the P-BCH 304, e.g., SDCCH 312. For example, after scheduling a first scheduling unit, e.g., SU-1 320, planning component 218 can determine, and so indicate, to schedule a second scheduling unit SU-2 352 every τ 365, where τ=24000 slots, beginning $\tau_{OFF}$ 355 with $\tau_{OFF}$=23873 from the time SU-1 is scheduled. It should be appreciated that a planning component 218 can use time sequences other than a fixed cycle of period τ. Generally, planning component 218 can determine to schedule SU-2 352 according to substantially any time sequence—time sequences can be generated by time sequence generator 221. It is to be appreciated that while in system 200 time sequence generator 221 resides outside planning component 218, scheduler 215 an rely on a consolidated planning component 218 that contains time sequence generator 221.

(iii) Transitive-Explicit Scheduling Plan.

Features of plan (i) can be complemented with the following aspect to yield a third scheduling plan: A scheduled SU (e.g., SU-1 410, or 420) can carry a time indication (e.g., 415 or 425) to a second SU (e.g., SU-1' 430) in a same control channel (e.g., P-BCH in LTE); the second SU (e.g., SU-1' 430) conveys a time indication 433 at which a third SU (e.g., SU-2) is to be scheduled in the channel associated with the broadcast channel, e.g., SDCCH 312.

It should be appreciated that scheduling the SUs, in either category SU-1 308 or SU-2 316, proceeds according to standards scheduling algorithms, like round robin, fair queuing, maximum throughput, proportional fairness, and so on. Additionally, it is noted that while SU-1 308 and SU-2 316 have been utilized as example units of system information, other categories of less frequently scheduled units can be implemented in substantially the same manner of plans (i)-(iii).

It is noted that processor 225 is configured to perform a portion, or substantially all, the functional action(s) of components in base station 210. As illustrated in block diagram 200, memory 235 is coupled to the processor 225 and can be utilized to store various data, instructions, directives, and the like, that facilitate operation of the processor 225.

Scheduled system information, or scheduling units 245, are typically conveyed via a forward link (FL) to an access terminal 250 which decodes the system information via a detection component 255. Detection component 255 generally includes a set of correlators (not shown) to detect pilot signals, data, and scheduling information; for example, cell ID, timing information (e.g., symbol boundary), frequency synchronization, information, and the like, can be detected through correlation of received SUs. Additionally, in particular in mobile stations that operate in MIMO and SIMO, detection component 255 can include serial-to-parallel and parallel-to-serial components (not shown), as well as Fourier transformation components, Hadamard transformation components and component that generate the inverse of such transformations. It is noted that processor 265 is configured to perform a portion, or substantially all, the functional action(s) (e.g., computations) of components in detection component 255. As illustrated in block diagram 200, memory 275 is coupled to the processor 265 and can be utilized to store various data structures, instructions, directives, and the like, that facilitate operation of the processor 265.

Figure 5:
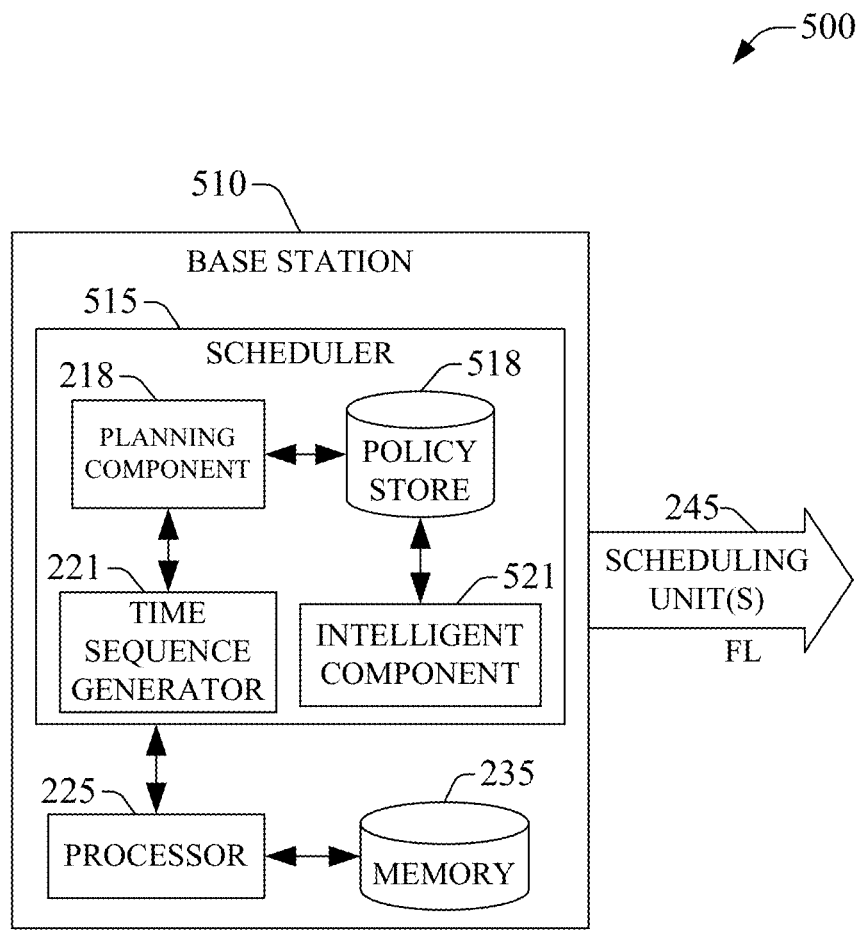
FIG. 5 illustrates another example system that facilitates scheduling system information in accordance with aspects described in the subject description.

FIG. 5 illustrates an example system 500 that facilitates scheduling system information in accordance with aspects described in the subject description. Base station 510 comprises a scheduler 515 which provides scheduling functionality to schedule scheduling units 245. It is noted that processor 265 is configured to perform a portion, or substantially all, the functional action(s) of components in scheduler 515. As illustrated in block diagram 500, memory 235 is coupled to the processor 225 and can be utilized to store various data, instructions, reference time sequences, scheduling plans, and the like, which facilitate operation of the processor 225. Scheduler 515 includes a planning component 218 and a time sequence generator 221; both components operate in substantially the same manner as disclosed above in connection with FIG. 2. Additionally, scheduler 515 includes a policy store 518 that comprises scheduling plans (or policies). Such scheduling plans support scheduling conducted through planning component 218. For example, a scheduling plan in policy store can modify a time sequence utilized to reference and schedule scheduling units in order to prevent collisions on a channel associated with a broadcast channel. In addition, scheduling plans in policy store can be based on communication conditions of a service cell, or sector, serviced by base station 510; for instance, antenna configuration; cell/sector load and other sector interference; and so forth. It should be appreciated that policy store 518 can also include scheduling plans for scenarios in which a roaming mobile terminal enter a service cell or sector.

In addition, to facilitate operation of scheduler 515, e.g., determining reference time sequences for scheduling system information, an intelligent component can operate in the scheduler. In an aspect, intelligent component 521 can collect current and historic data on communication and cell/sector communication conditions and infer optimized scheduling plans and time sequence generation that ensure, for example, a reduced rate of collisions among scheduled system information scheduling units. In addition, inference can be exploited to adjust the rate at which scheduling units are scheduled and referenced, to substantially minimize "busy wait." Furthermore, through an intelligent component 521, scheduler 515 can infer optimal scheduling plans based at least in part on a current buffer size of scheduling units, queued to be conveyed, mode of operation, e.g, SISO, SIMO and MIMO mode, of mobile stations (FIG. 1) served by base station 210, and the like. Further yet, based on machine learning techniques, intelligent component 321 can modify scheduling policies and plans and stored such plan in policy store 318. Optimized plan can enhance perceived QoS by users through improvements in access terminal performance operation performance—e.g., battery power, buffer utilization, processing and communication overhead, transmission power, and so on.

As employed hereinbefore, and in other portions of the subject specification, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithms, and reinforced learning—to a set of available data (information) on the system.

In particular, to the accomplishment of the various automated aspects described above in connection with policies for load indicator generation and other automated aspects relevant to the subject innovation described herein, an AI component (e.g., component 320) can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.

Figure 6:
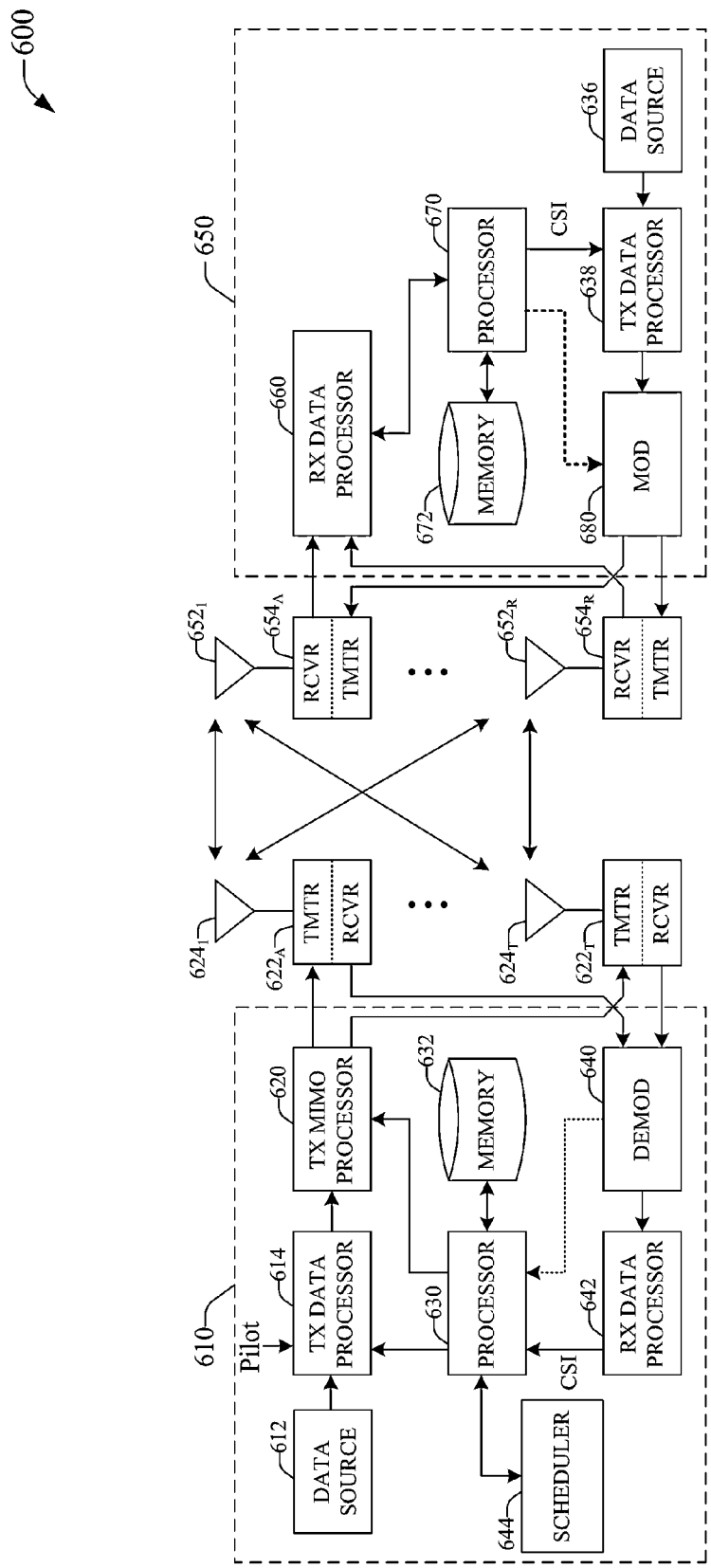
FIG. 6 is a block diagram of an example embodiment of a transmitter system and a receiver system in MIMO operation that can exploit aspects described in the subject specification.

FIG. 6 is a block diagram 600 of an embodiment of a transmitter system 610 (such as base station 210) and a receiver system 650 (e.g., access terminal 250) in a multiple-input multiple-output (MIMO) system that can provide for cell (or sector) communication in a wireless environment in accordance with one or more aspects set forth herein. At the transmitter system 610, traffic data for a number of data streams can be provided from a data source 612 to transmit (TX) data processor 614. In an embodiment, each data stream is transmitted over a respective transmit antenna. TX data processor 614 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or M-ary quadrature amplitude modulation (M-QAM)) selected for that data stream to provide modulation symbols. The data rate, coding, and modulation for each data stream may be determined by instructions executed by processor 630, the instructions as well as the data may be stored in memory 632.

The modulation symbols for all data streams are then provided to a TX MIMO processor 620, which may further process the modulation symbols (e.g., OFDM). TX MIMO processor 620 then provides $N_T$ modulation symbol streams to $N_T$ transceivers (TMTR/RCVR) $622_A$ through $622_T$. In certain embodiments, TX MIMO processor 620 applies beamforming weights (or precoding) to the symbols of the data streams and to the antenna from which the symbol is being transmitted. Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $622_A$ through $622_T$ are then transmitted from $N_T$ antennas $624_1$ through $624_T$, respectively. At receiver system 650, the transmitted modulated signals are received by $N_R$ antennas $652_1$ through $652_R$ and the received signal from each antenna 652 is provided to a respective transceiver (RCVR/TMTR) $654_A$ through $654_R$. Each transceiver $654_1$-$654_R$ conditions (e.g., filters, amplifies, and downconverts) a respective received signal, digitizes the conditioned signal to provide samples, and further processes the samples to provide a corresponding "received" symbol stream.

An RX data processor 660 then receives and processes the $N_R$ received symbol streams from $N_R$ transceivers $654_1$-$654_R$ based on a particular receiver processing technique to provide $N_T$ "detected" symbol streams. The RX data processor 660 then demodulates, deinterleaves, and decodes each detected symbol stream to recover the traffic data for the data stream. The processing by RX data processor 660 is complementary to that performed by TX MIMO processor 620 and TX data processor 614 at transmitter system 610. A processor 670 periodically determines which pre-coding matrix to use, such a matrix can be stored in memory 672. Processor 670 formulates a reverse link message comprising a matrix index portion and a rank value portion. Memory 672 may store instructions that when executed by processor 670 result in formulating the reverse link message. The reverse link message may comprise various types of information regarding the communication link or the received data stream, or a combination thereof. In particular, such information can comprise channel quality indicator report(s) (such as CQI 279), an offset for adjusting a scheduled resource, or sounding reference signals for link (or channel) estimation. The reverse link message is then processed by a TX data processor 638, which also receives traffic data for a number of data streams from a data source 636, modulated by a modulator 680, conditioned by transceiver $654_A$ through $954_R$, and transmitted back to transmitter system 610.

At transmitter system 610, the modulated signals from receiver system 650 are received by antennas $624_1$-$624_T$, conditioned by transceivers $622_A$-$622_T$, demodulated by a demodulator 640, and processed by a RX data processor 642 to extract the reserve link message transmitted by the receiver system 650. Processor 630 then determines which pre-coding matrix to use for determining the beamforming weights and processes the extracted message. In addition, processor 630 operates, and provides functionality to, scheduler component 644, or simply scheduler 644, which operates in accordance with aspects described in the subject specification in connection with components 215 and 515.

As discussed above, in connection with FIG. 1, a receiver 650 can dynamically scheduled to operate in SIMO, SU-MIMO, and MU-MIMO, depending at least in part on the channel quality indicators reported by said receiver. Next, communication in these modes of operation is described. It is noted that in SIMO mode a single antenna at the receiver ($N_R$=1) is employed for communication; therefore, SIMO operation can be interpreted as a special case of SU-MIMO. Single-user MIMO mode of operation corresponds to the case in which a single receiver system 650 communicates with transmitter system 610, as previously illustrated FIG. 6 and according to the operation described in connection therewith. In such a system, the $N_T$ transmitters $624_1$-$624_T$ (also known as TX antennas) and $N_R$ receivers $652_1$-$652_R$ (also known as RX antennas) form a MIMO matrix channel (e.g., Rayleigh channel, or Gaussian channel, with slow or fast fading) for wireless communication. As mentioned above, the SU-MIMO channel is described by a $N_R \times N_T$ matrix of random complex numbers. The rank of the channel equals the algebraic rank of the $N_R \times N_T$ matrix, which in terms of space-time, or space-frequency coding, the rank equals the number $N_V \leq \min\{N_T, N_R\}$ of independent data streams (or layers) that can be sent over the SU-MIMO channel without inflicting inter-stream interference.

In one aspect, in SU-MIMO mode, transmitted/received symbols with OFDM, at tone co, can be modeled by:

$$y(\omega) = \underline{H}(\omega)c(\omega) + n(\omega). \quad (2)$$

Here, $y(\omega)$ is the received data stream and is a $N_R \times 1$ vector, $\underline{H}(\omega)$ is the channel response $N_R \times N_T$ matrix at tone $\omega$ (e.g., the Fourier transform of the time-dependent channel response matrix h), $c(\omega)$ is an $N_T \times 1$ output symbol vector, and $n(\omega)$ is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 610, and $N_V$ can be scheduled at the discretion of the transmitter (e.g., transmitter 610, Node B 210, or access point 110) based at least in part on channel conditions and the rank reported in a scheduling request by a terminal (e.g., receiver 650). Similarly, system information can be conveyed in a MIMO configuration by exploiting $N_V$ layers. It should be appreciated that $c(\omega)$ is the result of at least one multiplexing scheme, and at least one precoding (or beamforming) scheme applied by the transmitter. Additionally, $c(\omega)$ can be convoluted with a power gain matrix, which determines the amount of power transmitter 610 allocates to transmit each data stream $N_V$. It should be appreciated that such a power gain matrix can be a resource that is assigned to a terminal (e.g., access terminal 250, receiver 650, or UE 160) through a scheduler in the serving node in response, at least in part, to a reported CQI.

Figure 7:
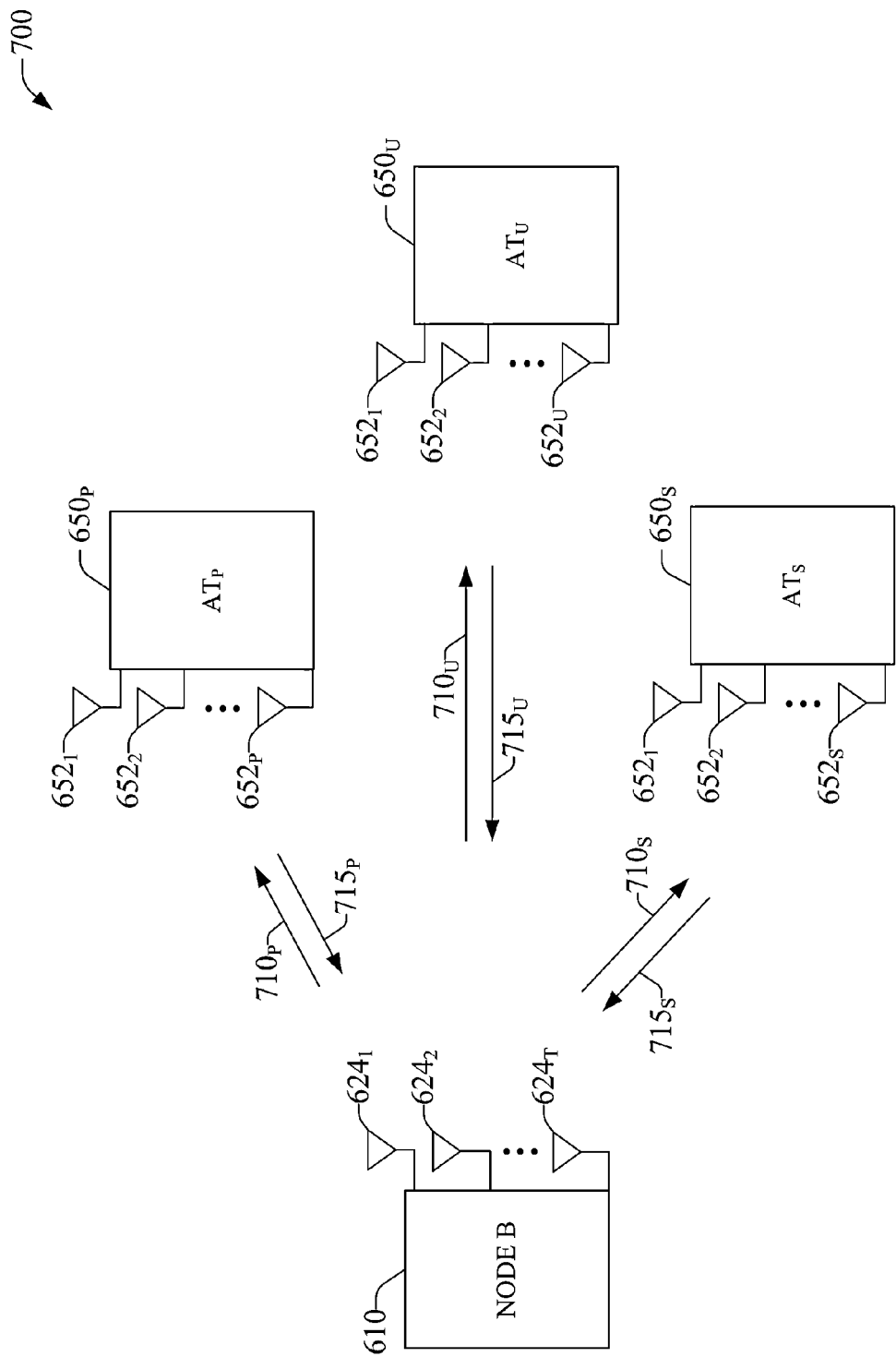
FIG. 7 is a block diagram that illustrates an example MU-MIMO system.

As mentioned above, according to an aspect, MU-MIMO operation of a set of terminals (e.g., mobiles $170_1$-$170_6$) is within the scope of the subject innovation. Moreover, scheduled MU-MIMO terminals operate jointly with SU-MIMO terminals and SIMO terminals. FIG. 7 illustrates an example multiple-user MIMO system 700 in which three ATs $650_P$, $650_U$, and $650_S$, embodied in receivers substantially the same as receiver 650, communicate with transmitter 610, which embodies a Node B. It should be appreciated that operation of system 700 is representative of operation of substantially any group (e.g., 185) of wireless devices, such as terminals $170_1$-$170_6$, scheduled in MU-MIMO operation within a service cell by a centralized scheduler residing in a serving access point (e.g., 110 or 250). As mentioned above, transmitter 610 has $N_T$ TX antennas $624_1$-$624_T$, and each of the ATs has multiple RX antennas; namely, $AT_P$ has $N_P$ antennas $652_1$-$652_P$, $AP_U$ has $N_U$ antennas $652_1$-$652_U$, and $AP_S$ has $N_S$ antennas $652_1$-$652_S$. Communication between terminals and the access point is effected through uplinks $715_P$, $715_U$, and $715_S$. Similarly, downlinks $710_P$, $710_U$, and $710_S$ facilitate communication between Node B 610 and terminals $AT_P$, $AT_U$, and $AT_S$, respectively. Additionally, communication between each terminal and base station is implemented in substantially the same manner, through substantially the same components, as illustrated in FIG. 6 and discussed in the description thereof.

Terminals can be located in substantially different locations within the cell serviced by access point 610 (e.g., cell 180), therefore each user equipment $650_P$, $650_U$, and $650_S$ has its own MIMO matrix channel $h_\alpha$ and response matrix $H_\alpha$ ($\alpha$=P, U, and S), with its own rank (or, equivalently, singular value decomposition), and its own associated channel quality indicator. Due to the plurality of users present in the cell serviced by the base station 610, intra-cell interference can be present and can affect CQI values reported by each of terminals $650_P$, $650_U$, and $650_S$. The interference can particularly affect the scheduling of SUs (e.g., scheduling units 245) of system information, as scheduled packets can fail to be detected by an access terminal (e.g., $650_P$, $650_U$, and $650_S$). In an aspect, a scheduling plan for one or more of the terminals can be dynamically, and autonomously, modified through intelligent component 521 once interference reaches a specific threshold.

Although illustrated with three terminals in FIG. 7, it should be appreciated that a MU-MIMO system can comprise substantially any number of terminals (e.g., group 185 contains six terminals $170_1$-$170_6$); each of such terminals indicated below with an index k. In accordance with various aspects, each of the access terminals $650_P$, $650_U$, and $650_S$ can receive system information from Node B 610, according to at least one of plans (i), (ii), and (ii) described in connection with FIG. 2. In addition, Node B 610 can dynamically re-schedule each of terminals $650_P$, $650_U$, and $650_S$ in a disparate mode of operation, like SU-MIMO or SISO, and establish a disparate plan for scheduling of system information for each of the terminals.

In one aspect, transmitted/received symbols with OFDM, at tone w and for user k, can be modeled by:

$$y_k(\omega) = \underline{H}_k(\omega)c_k(\omega) + \underline{H}_k(\omega)\Sigma'c_m(\omega) + n_k(\omega). \quad (3)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $\underline{H}_k$) of symbols transmitted by a transmitter (e.g., access point 250) to the other users in the cell.

Figure 8A:
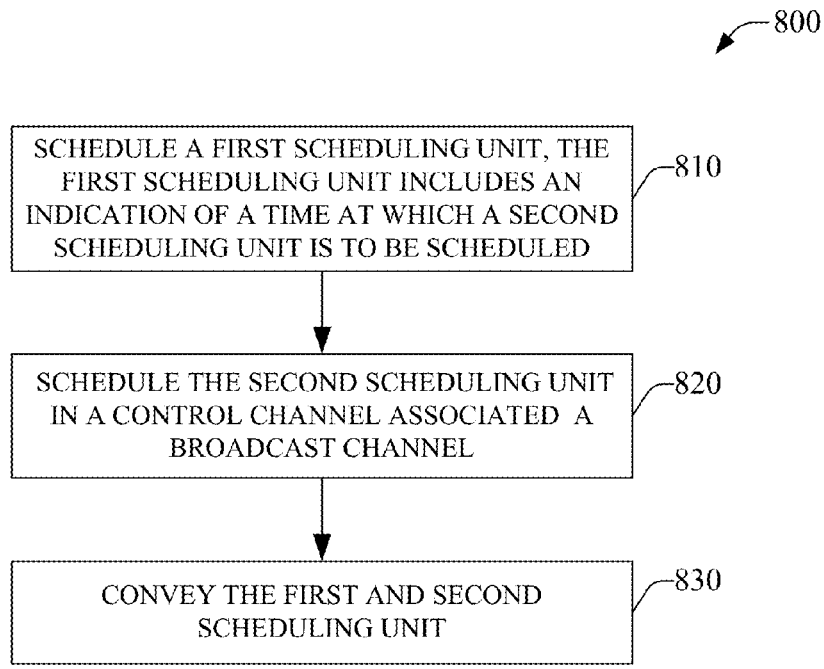
FIGS. 8A and 8B present flowcharts of example methods for scheduling system information utilizing time references to disparate scheduling units in accordance with aspects described in the subject specification.
Figure 8B:
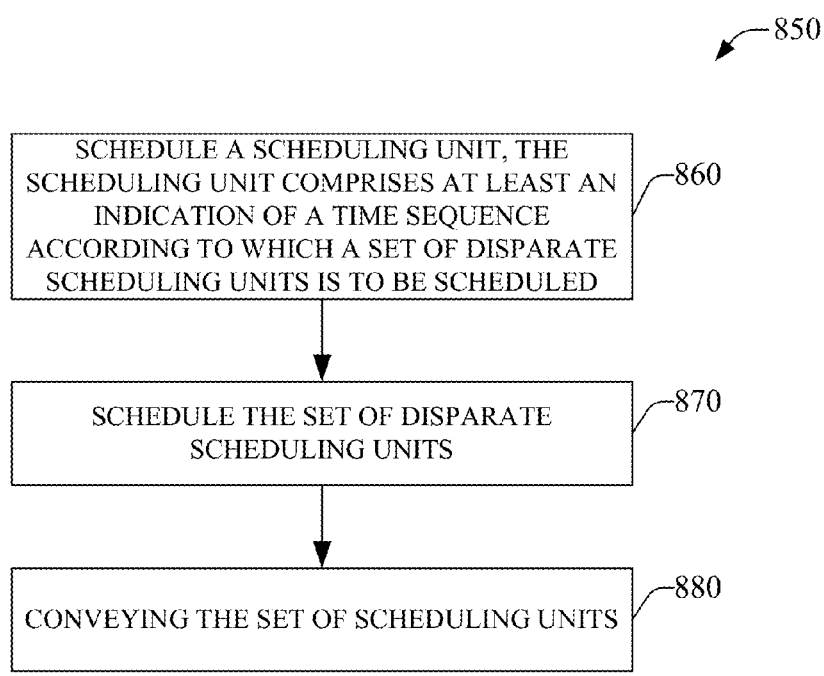
Figure 9:
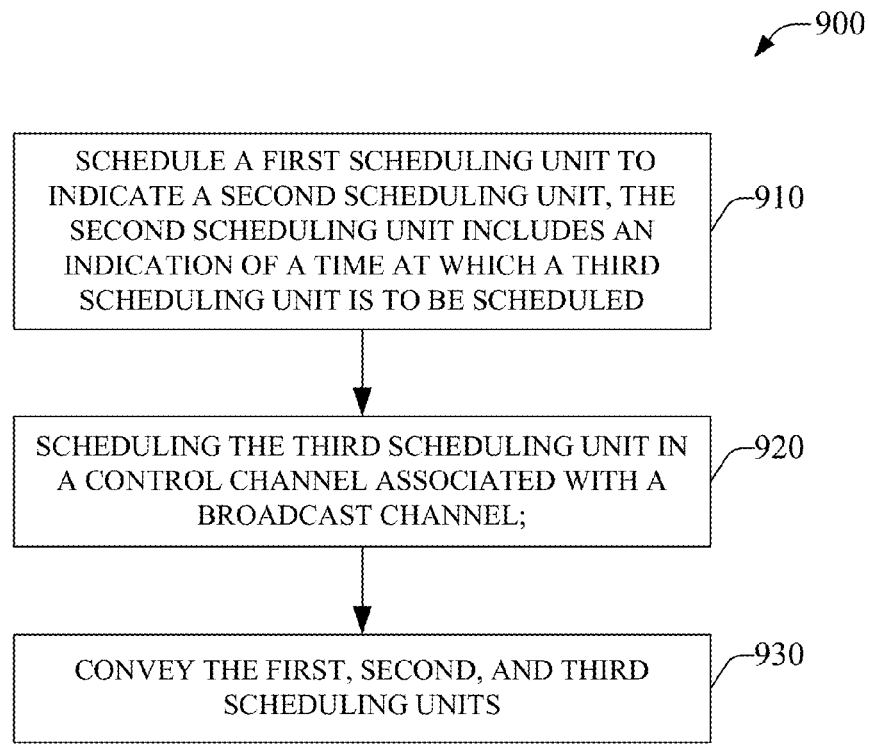
FIG. 9 is a flowchart of an example method that facilitates scheduling system information by referencing disparate scheduling units in accordance with aspects disclosed in the subject specification.
Figure 10:
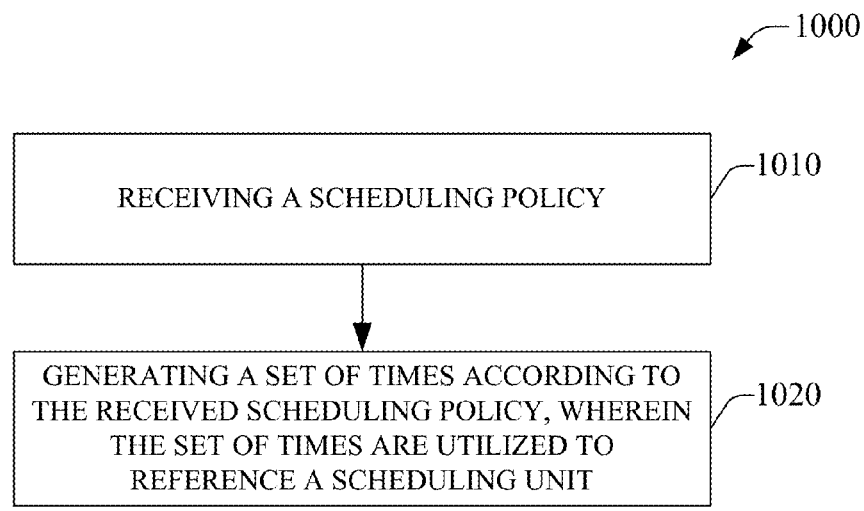
FIG. 10 is a flowchart of an example method that facilitates generating time references according to a scheduling policy according to aspects set forth in the subject specification.

In view of the example systems, and associated aspects, presented and described above, methodologies for flexible channel quality indicator reporting that may be implemented in accordance with the disclosed subject matter can be better appreciated with reference to the flowcharts of FIGS. 8, 9 and 10. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). It should be further appreciated that the methodologies disclosed hereinafter and throughout the subject specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIGS. 8A and 8B are flowchart of example methods 800 and 850, respectively, for scheduling system information utilizing time references to disparate scheduling units. Referring to FIG. 8A, at act 810 a first scheduling unit is scheduled, the scheduling unit includes an indications of a time at which a second scheduling unit is to be scheduled. At act 820, the second scheduling unit is scheduled in a control channel associated with a broadcast channel, as discussed above in connection with FIGS. 4A and 4B, and FIG. 5. At act 830, the first and second scheduling units are conveyed.

Regarding FIG. 8B, at act 860 a first scheduling unit is scheduled. The scheduling unit comprises at least an indication of a time sequence according to which a set of disparate scheduling units is to be scheduled. At act 870, the set of disparate scheduling units is scheduled. At act 880, the set of scheduling units is conveyed.

FIG. 9 is a flowchart of an example method 900 that facilitates scheduling system information by referencing disparate scheduling units. Act 910, a first scheduling unit is scheduled to indicate a second scheduling unit. The referenced second scheduling unit includes an indication of a time at which a third scheduling unit is to be scheduled. At act 920, the third scheduling sequence is scheduled in a control channel associated with a broadcast channel. It should be appreciated that the first and second scheduling units are typically scheduled in the same channel, e.g., DL-SCH in an LTE system; the associated control channel is utilized to schedule referenced SUs. At act 930, the first, second, and third scheduling units are conveyed.

FIG. 10 is a flowchart of an example method 1000 that facilitates generating time references according to a scheduling policy. As discussed above, a scheduling policy can reside in a policy store (e.g., policy store 318) in a base station. Typically such a scheduling policy is determined by a service provider that services a mobile terminal in an area of coverage of the base station. In an aspect, a policy store associated with disparate service providers can be stored in the base station, to facilitate roaming of wireless devices. At act 1010, a scheduling policy is received. At act 1020, a set of times is generated according to the received scheduling policy. The set of times are utilized as time reference to indicate a scheduling reference to a scheduling unit.

Figure 11:
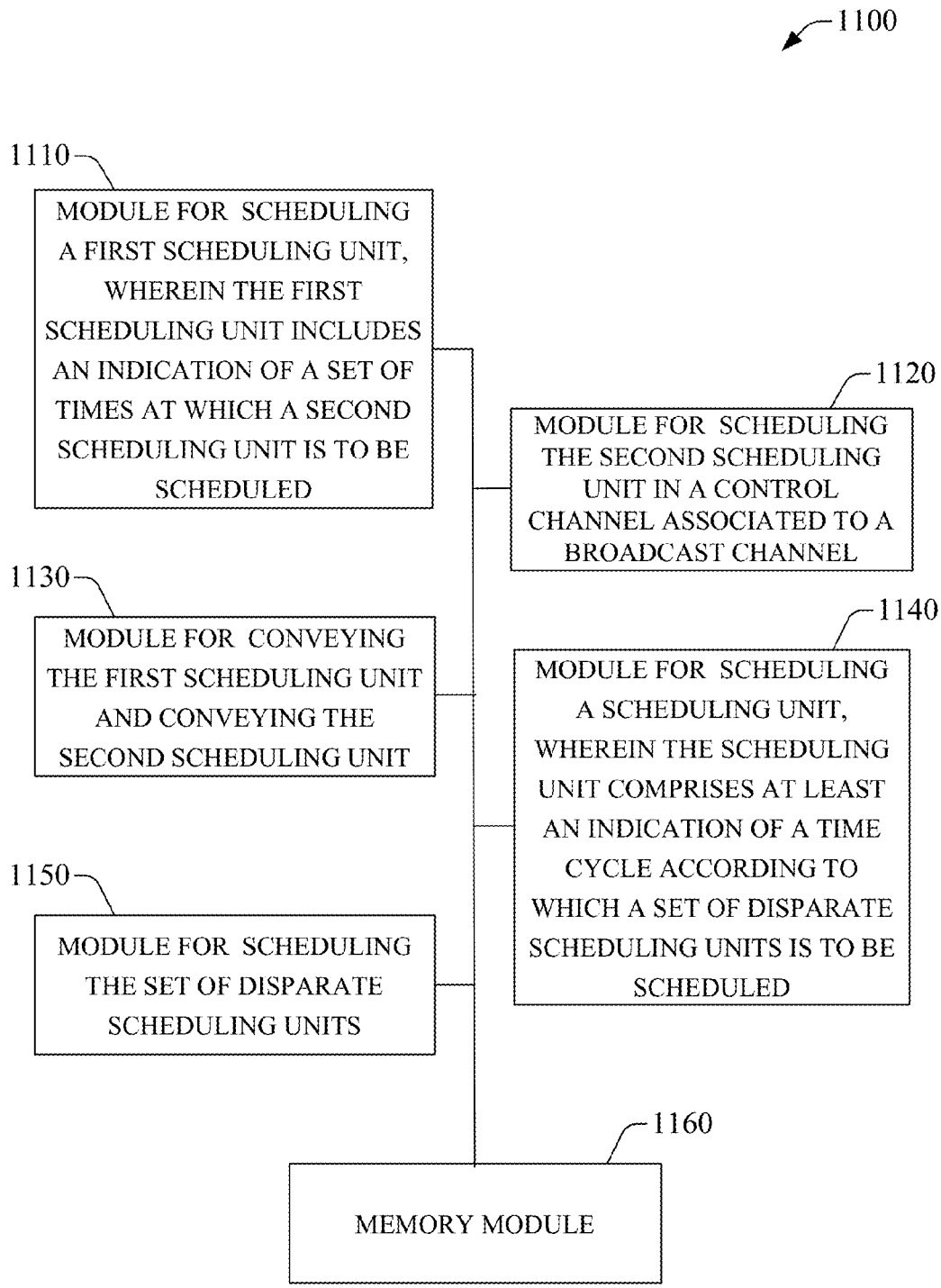
FIG. 11 illustrates a block diagram of an example system that facilitates scheduling units according to aspects described in the subject specification.

FIG. 11 illustrates a block diagram of an system 1100 that facilitates scheduling units according to aspects described in the subject specification. System 1100 may include a module 1110 for scheduling a first scheduling unit, wherein the first scheduling unit includes an indication of a set of times at which a second scheduling unit is to be scheduled; a module 1120 for scheduling the second scheduling unit in a control channel associated to a broadcast channel; a module 1130 for conveying the first scheduling unit and conveying the second scheduling unit; a module 1140 for scheduling a scheduling unit, wherein the scheduling unit comprises at least an indication of a time cycle according to which a set of disparate scheduling units is to be scheduled; and a module 1150 for scheduling the set of disparate scheduling units. Modules 1110, 1120, 1130, 1140, and 1150 can be a processor or any electronic device, and may be coupled to memory module 1160.

Figure 12:
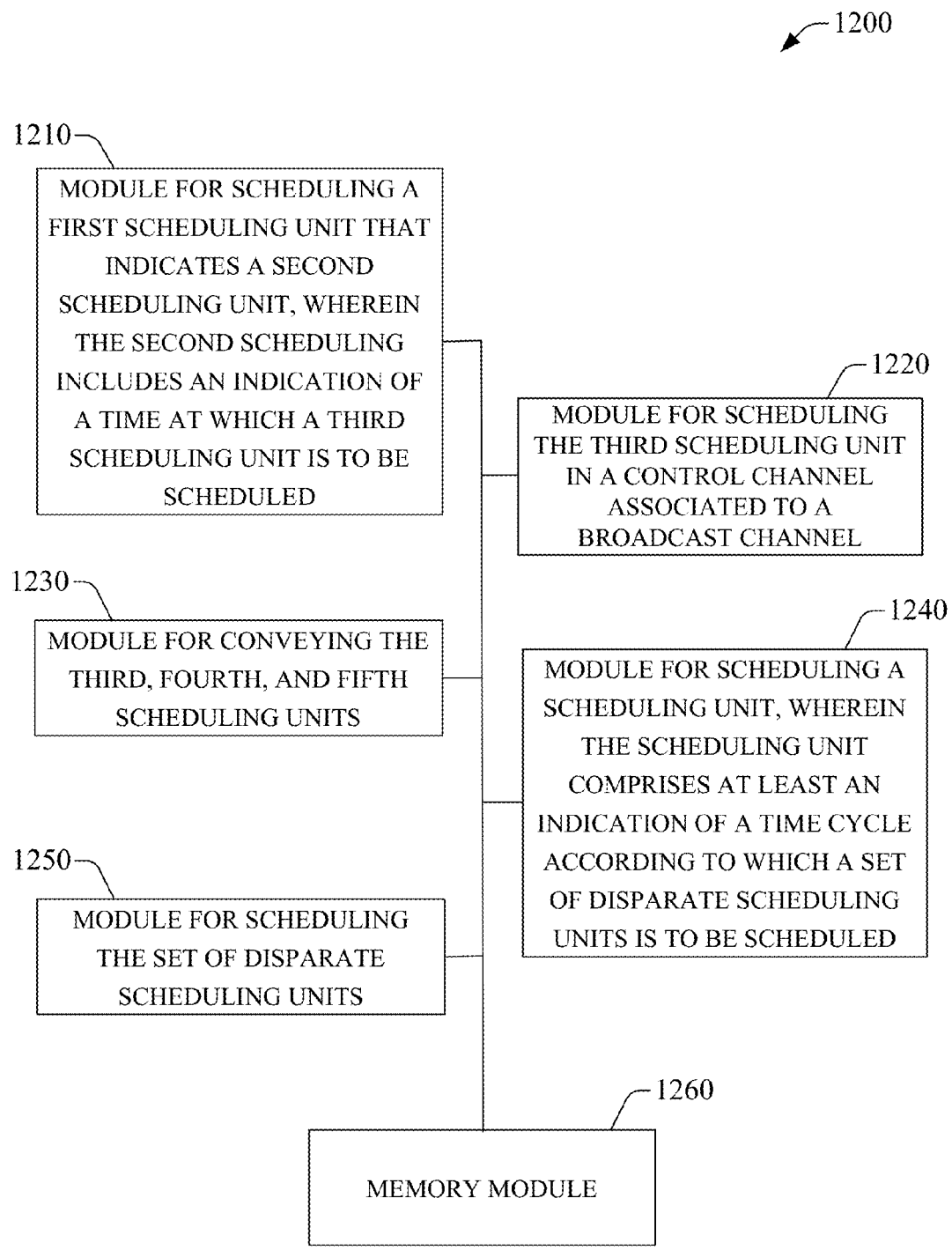
FIG. 12 illustrates a block diagram of an example system that facilitates scheduling units according to aspects described in the subject specification.

FIG. 12 illustrates a block diagram of an example system 1200 that facilitates scheduling units according to aspects described in the subject specification. System 1200 may include a module 1210 for scheduling a first scheduling unit that indicates a second scheduling unit, wherein the second scheduling includes an indication of a time at which a third scheduling unit is to be scheduled; a module 1220 for scheduling the third scheduling unit in a control channel associated to a broadcast channel; a module 1230 for conveying the third, fourth, and fifth scheduling units; a module 1240 for scheduling a scheduling unit, wherein the scheduling unit comprises at least an indication of a time cycle according to which a set of disparate scheduling units is to be scheduled; and a module 1250 for scheduling the set of disparate scheduling units. Modules 1210, 1220, 1230, 1240, and 1250 can be a processor or any electronic device, and may be coupled to memory module 1260.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction(s) or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes," "including," "posses," "possessing," or variants thereof are used in either the detailed description or the claims, such terms are intended to be inclusive in a manner similar to the term "comprising" as "comprising" is interpreted when employed as a transitional word in a claim.

What is claimed is:

1. A method for scheduling system information in a wireless communication system, comprising:
   generating a set of times according to a scheduling policy, wherein the set of times is utilized to reference a first scheduling unit;
   scheduling the first scheduling unit, wherein the first scheduling unit includes an indication of a time at which a second scheduling unit is to be scheduled and by which to ensure a receiver is enabled, wherein the indication of the time at which the second scheduling unit is to be scheduled conveys a lower bound at which the second scheduling unit is scheduled;
   scheduling the second scheduling unit in a control channel associated with a broadcast channel; and
   conveying the first and second scheduling units.

2. The method of claim 1, wherein at least one of the scheduling the first scheduling unit and the scheduling the second scheduling unit comprises using at least one of a round robin algorithm, a fair queuing algorithm, a maximum throughput algorithm, and a proportional fairness algorithm.

3. The method of claim 1, further comprising:
   scheduling a third scheduling unit, wherein the third scheduling unit comprises at least an indication of a time sequence according to which a set of disparate scheduling units is to be scheduled;
   scheduling the set of disparate scheduling units; and
   conveying the set of disparate scheduling units.

4. The method of claim 3, wherein the time sequence is a periodic sequence.

5. The method of claim 4, wherein the indication of the time sequence comprises an offset that conveys a time slot at which the periodic sequence begins.

6. The method of claim 4, wherein a service provider determines a period of the periodic sequence.

7. The method of claim 3, further comprising inferring a time sequence that optimizes the scheduling policy.

8. The method of claim 3, wherein the scheduling the set of disparate scheduling units comprises at least one of a round robin algorithm, a fair queuing algorithm, a maximum throughput algorithm, and a proportional fairness algorithm.

9. A method employed in a wireless communication system, comprising:
   generating a set of times according to a scheduling policy, wherein the set of times is utilized to reference a first scheduling unit;
   scheduling the first scheduling unit, wherein the first scheduling unit indicates a time at which a second scheduling unit is to be scheduled and by which to ensure a receiver is enabled, the second scheduling unit includes an indication of a time at which a third scheduling unit is to be scheduled, and the indication of the time at which the third scheduling unit is to be scheduled conveys a lower bound at which the third scheduling unit is scheduled;
   scheduling the third scheduling unit in a control channel associated with a broadcast channel; and
   conveying the first, second, and third scheduling units.

10. The method of claim 9, wherein at least one of the scheduling the first scheduling unit, the scheduling the second scheduling unit, and the scheduling the third scheduling unit comprises using at least one of a round robin algorithm, a fair queuing algorithm, a maximum throughput algorithm, and a proportional fairness algorithm.

11. A wireless communication device, comprising:
   a processor configured to:
      generate a set of times according to a scheduling policy, wherein the set of times is utilized to reference a first scheduling unit;
      associate a control channel to a broadcast channel;
      schedule the first scheduling unit, wherein the first scheduling unit carries at least an indication of a time at which a second scheduling unit is to be scheduled and by which to ensure a receiver is enabled, and the time at which the second scheduling unit is to be scheduled is a lower bound at which the second scheduling unit is scheduled;
      schedule the second scheduling unit in the control channel associated to the broadcast channel;
      schedule a third scheduling unit that indicates a time at which a fourth scheduling unit is to be scheduled, wherein the fourth scheduling unit comprises an indication of a time at which a fifth scheduling unit is to be scheduled; and
      schedule the fifth scheduling unit in the control channel associated with the broadcast channel; and
   a memory coupled to the processor.

12. The wireless communication device of claim 11, wherein the processor is further configured to convey the first, second, third, fourth, and fifth scheduling units.

13. The wireless communication device of claim 12, wherein a service provider that serves the wireless communication device determines a time cycle.

14. The wireless communication device of claim 11, wherein the processor is configured to schedule the first, second, third, fourth, and fifth scheduling units using at least one of a round robin algorithm, a fair queuing algorithm, a maximum throughput algorithm, and a proportional fairness algorithm.

15. The wireless communication device of claim 11, wherein the processor is further configured to:
  schedule a sixth scheduling unit comprising at least an indication of a time cycle according to which a set of disparate scheduling units is to be scheduled; and
  schedule the set of disparate scheduling units.

16. The wireless communication device of claim 15, wherein the first scheduling unit further comprises an indication of a time offset that conveys a time slot at which the time cycle begins.

17. The wireless communication device of claim 16, wherein the indication of the time offset conveys at least one of an explicit communication slot, an explicit radio frame, and an explicit radio sub-frame.

18. The wireless communication device of claim 15, wherein the processor is further configured to convey the set of disparate scheduling units.

19. The wireless communication device of claim 15, wherein a time to schedule a disparate scheduling unit is determined according to a scheduling plan.

20. The wireless communication device of claim 11, wherein the wireless communication device is a base station.

21. A non-transitory computer-readable medium having stored thereon:
  code for causing at least one computer to generate a set of times according to a scheduling policy, wherein the set of times is utilized to reference a first scheduling unit;
  code for causing at least one computer to schedule the first scheduling unit, wherein the first scheduling unit conveys at least an indication of an instance at which a second scheduling unit is to be scheduled and by which to ensure a receiver is enabled, and the indication of the instance at which the second scheduling unit is to be scheduled conveys a lower bound at which the second scheduling unit is scheduled;
  code for causing the at least one computer to schedule the second scheduling unit in a control channel associated with a broadcast channel;
  code for causing the at least one computer to schedule a third scheduling unit that indicates a fourth scheduling unit, wherein the fourth scheduling includes an indication of a time at which a fifth scheduling unit is to be scheduled;
  code for causing the at least one computer to schedule the fifth scheduling unit in the control channel associated with the broadcast channel; and
  code for causing the at least one computer to convey the first, second, third, fourth, and fifth scheduling units.

22. The non-transitory computer-readable medium of claim 21, wherein the time at which the fifth scheduling unit is to be scheduled conveys an explicit instant at which the fifth scheduling unit is scheduled.

23. The non-transitory computer-readable medium of claim 21, wherein the time at which the fifth scheduling unit is to be scheduled is a lower bound to an actual instant at which the fifth scheduling unit is scheduled.

24. The non-transitory computer-readable medium of claim 21, further comprising:
  code for causing the at least one computer to schedule a sixth scheduling unit, wherein the sixth scheduling unit comprises at least an indication of a time sequence that dictates at which instances a set of disparate scheduling units is to be scheduled; and
  code for causing the at least one computer to schedule the set of disparate scheduling units.

25. The non-transitory computer-readable medium of claim 21, further comprising code for causing the at least one computer to infer a time sequence that optimizes the scheduling policy.

26. The non-transitory computer-readable medium of claim 21, wherein the non-transitory computer-readable medium is integrated with a base station.

27. An apparatus that operates in a wireless communication system, comprising:
  means for generating a set of times according to a scheduling policy, wherein the set of times is utilized to reference a first scheduling unit;
  means for scheduling the first scheduling unit, wherein the first scheduling unit includes an indication of a set of times at which a second scheduling unit is to be scheduled and by which to ensure a receiver is enabled, and a time at which the second scheduling unit is to be scheduled is a lower bound at which the second scheduling unit is scheduled;
  means for scheduling the second scheduling unit in a control channel associated with a broadcast channel; and
  means for conveying the first scheduling unit and conveying the second scheduling unit.

28. The apparatus of claim 27, further comprising:
  means for scheduling a third scheduling unit, wherein the third scheduling unit comprises at least an indication of a time cycle according to which a set of disparate scheduling units is to be scheduled; and
  means for scheduling the set of disparate scheduling units.

29. The apparatus of claim 28, wherein the third scheduling unit further comprises an indication of a time offset that conveys a time slot at which the time cycle begins.

30. The apparatus of claim 27, wherein the apparatus is a base station.

31. An apparatus that operates in a wireless system, comprising:
  means for generating a set of times according to a scheduling policy, wherein the set of times is utilized to reference a first scheduling unit;
  means for scheduling the first scheduling unit, wherein the first scheduling unit indicates a time at which a second scheduling unit is to be scheduled and by which to ensure a receiver is enabled, the indication of the time at which the second scheduling unit is to be scheduled conveys a lower bound at which the second scheduling unit is scheduled, and the second scheduling unit includes an indication of a time at which a third scheduling unit is to be scheduled;
  means for scheduling the third scheduling unit in a control channel associated with a broadcast channel; and
  means for conveying the first, second, and third scheduling units.

32. The apparatus of claim 31, further comprising:
  means for scheduling a fourth scheduling unit, wherein the fourth scheduling unit comprises at least an indication of a time cycle according to which a set of disparate scheduling units is to be scheduled; and
  means for scheduling the set of disparate scheduling units.

33. The apparatus of claim 32, wherein the fourth scheduling unit further comprises an indication of a time offset that conveys a time slot at which the time cycle begins.

34. The apparatus of claim 31, wherein the time at which the third scheduling unit is to be scheduled is a lower bound to an actual instant at which the third scheduling unit is scheduled.

35. The apparatus of claim 31, wherein the apparatus is a base station.

* * * * *